Figure 5:
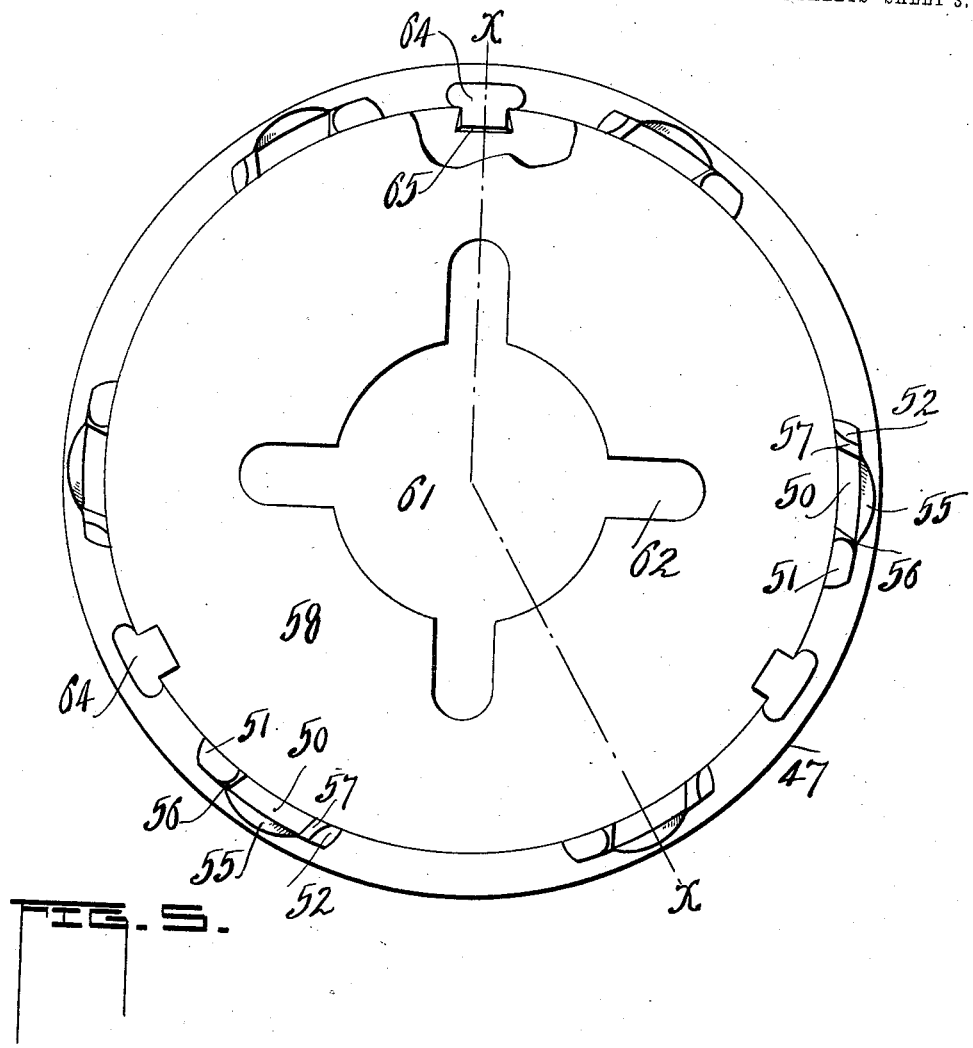

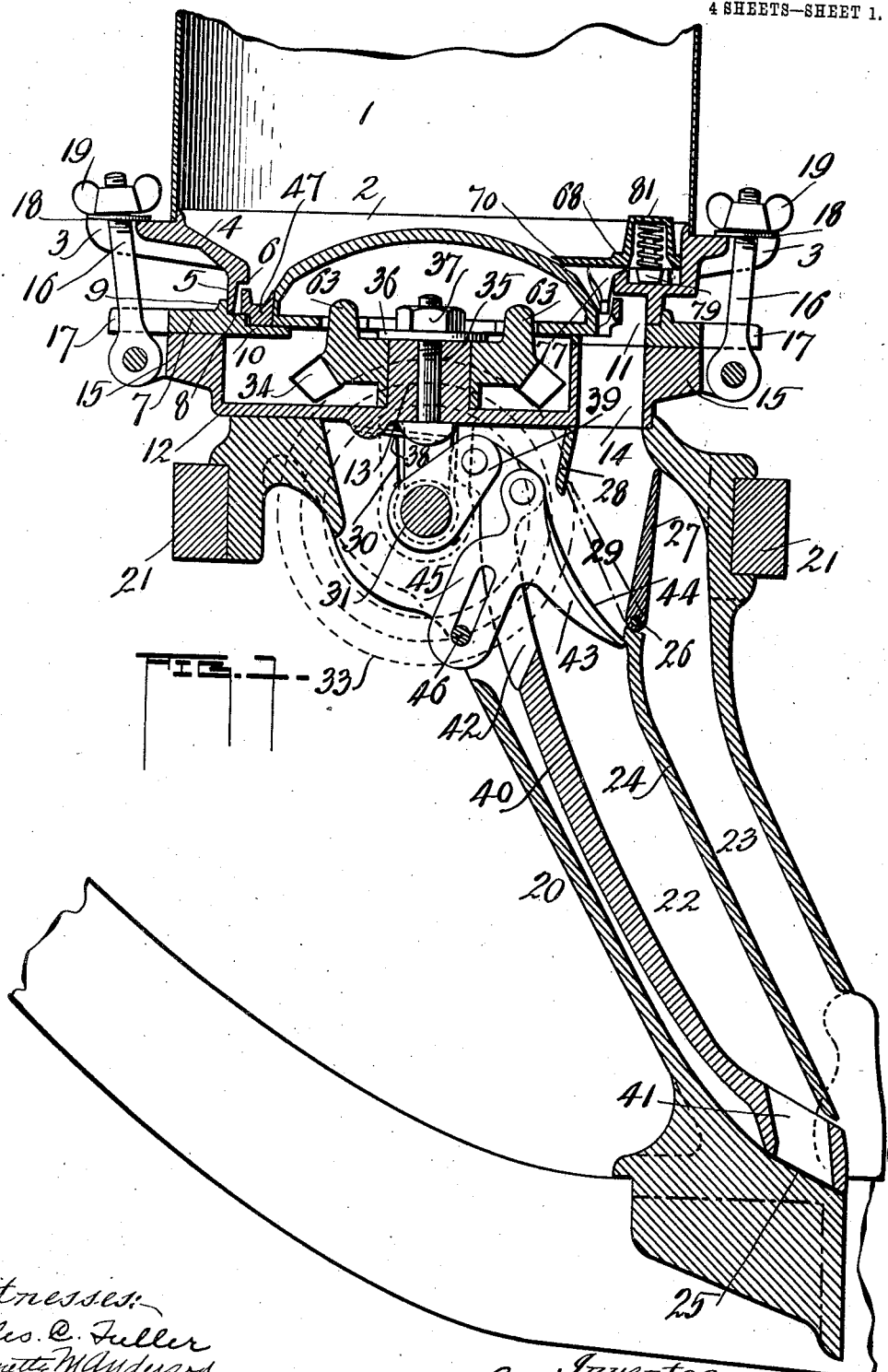

No. 893,426.
PATENTED JULY 14, 1908.
L. D. BENNER.
CORN PLANTER.
APPLICATION FILED APR. 13, 1907.
4 SHEETS—SHEET 2.
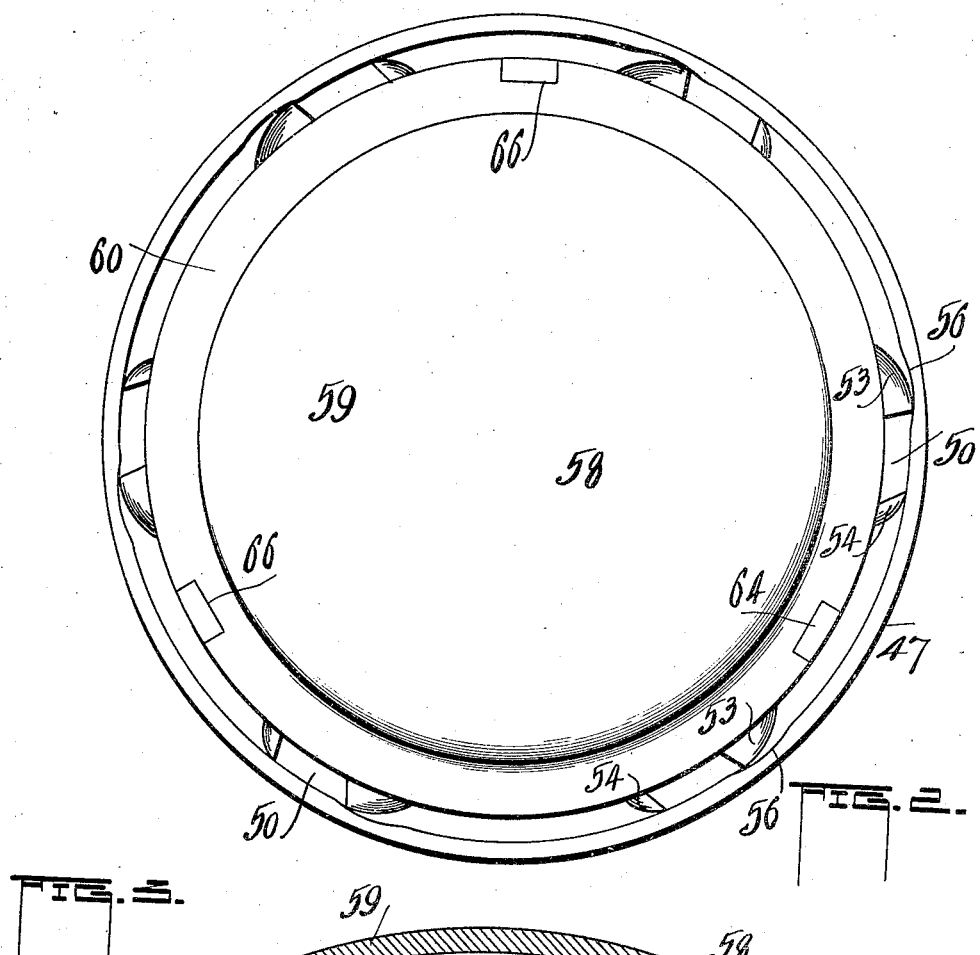
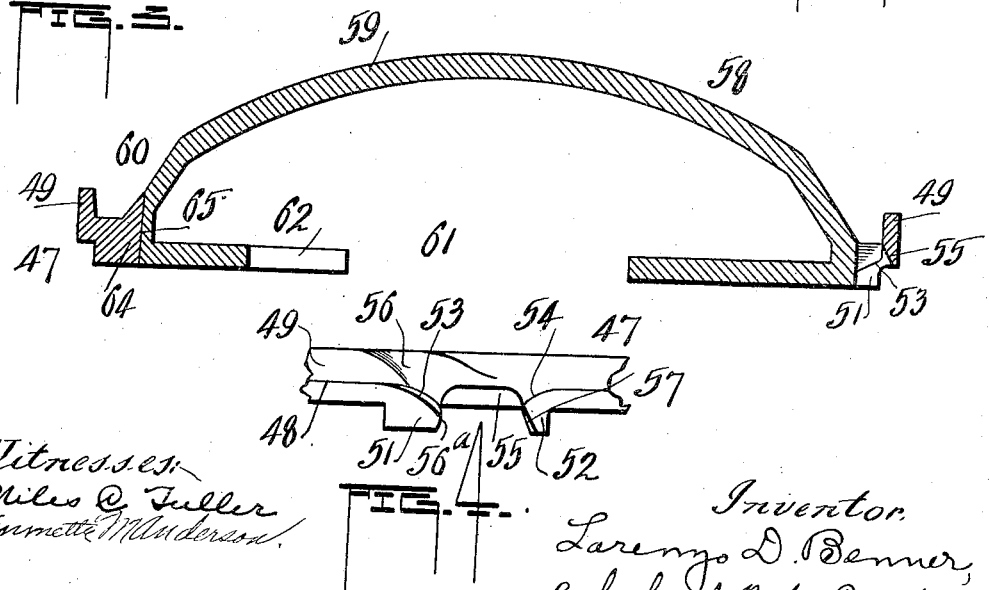
Witnesses:
Miles C. Fuller
Jennette M. Anderson
Inventor,
Lorenzo D. Benner,
By Chas. N. LaPorte
Atty.

No. 893,426. PATENTED JULY 14, 1908.
L. D. BENNER.
CORN PLANTER.
APPLICATION FILED APR. 13, 1907.

4 SHEETS—SHEET 3.

Witnesses:
Miles C. Fuller
Jeannette M. Anderson

Inventor.
Lorenzo D. Benner,
By Chas. N. DeParte
Atty.

No. 893,426.
PATENTED JULY 14, 1908.
L. D. BENNER.
CORN PLANTER.
APPLICATION FILED APR. 13, 1907.
4 SHEETS—SHEET 4.
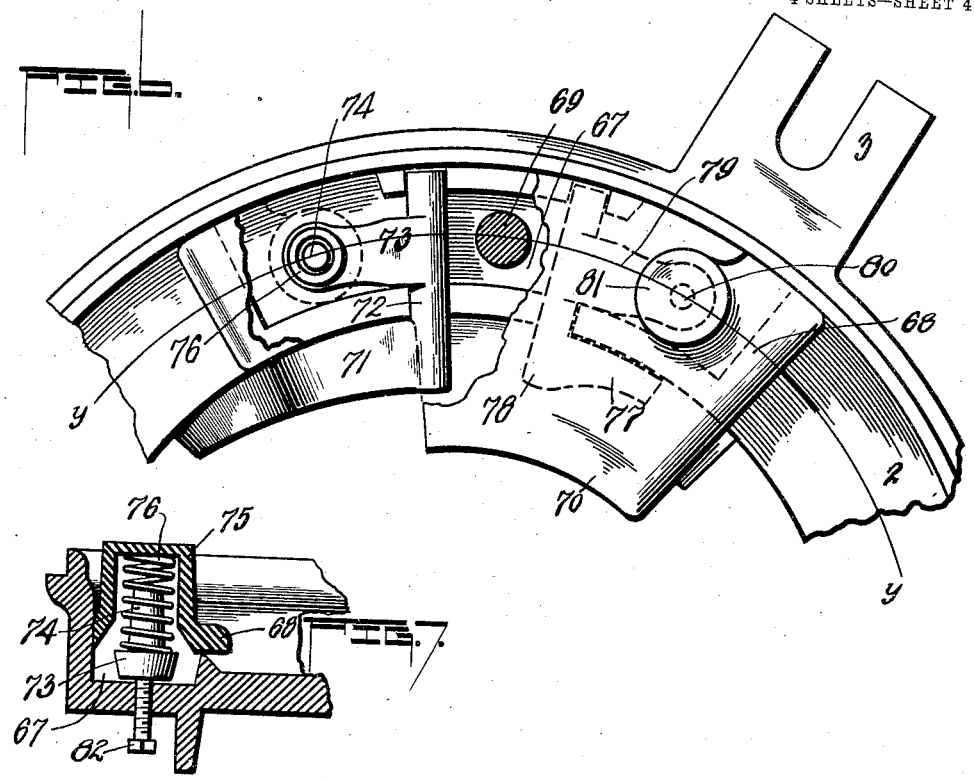
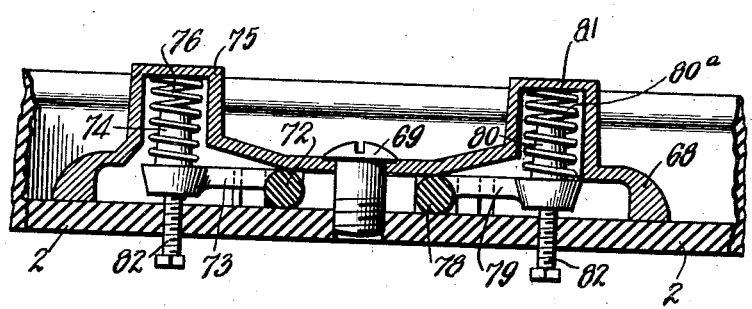
Witnesses:
Miles C. Fuller
Laura E. Claypool
Inventor
Lorenzo D. Benner
By
Chas. W. LaPorte
Atty.

UNITED STATES PATENT OFFICE.

LORENZO D. BENNER, OF PEORIA, ILLINOIS.

CORN-PLANTER.

No. 893,426.

Specification of Letters Patent.

Patented July 14, 1908.

Application filed April 13, 1907. Serial No. 368,065.

*To all whom it may concern:*

Be it known that I, LORENZO D. BENNER, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention has reference to improvements in seeding machines and relates more particularly to that type of machine known as corn planters.

The invention relates more particularly to the seed rings or seed plates and also to the valves operating in the conductor-tubes or shanks for controlling the discharge of the grain from the seed rings or plates, on to the ground.

One of the objects of the present invention is a seed plate consisting of an annular ring formed with an annular flange and a shelf or ridge portion; said shelf or ridge portion at intervals provided with cut-out portions serving as seed cells when said seed plate is combined with component parts of a seed-box; the end walls of said cells being formed by depending portions of the ledge of said ring.

A further object of the invention is the beveling of the opposite end walls of the openings and the ledge of said ring and also beveling in a suitable manner the inner wall of the flange thereof; to provide against the wedging of kernels of corn when dropped into the cells of the said ring or plate and to provide for their easy discharge when engaged by a knocker.

A further object of the invention is the provision of a seed plate composed of an annular ring provided with an annular flange and an annular ledge; said ledge provided with a series of openings, the said ring adapted to have a detachable connection with a dome shaped cap plate, the outer wall of which serves as the inner wall of the seed cells of said ring; the end walls of the cells of said ring having dissimilar beveled portions and the inner faces of said flange at points corresponding with said cells being suitably beveled to facilitate in receiving and discharging only one kernel of corn in each cell at a time.

The invention has for its further object a seed plate composed of an annular ring provided with seed cells having open inside face and partially open outside faces; a center cap plate to which the seed plate has a detachable connection; the construction and arrangement of the cells of the said seed plate are such as to adapt the said seed plate to receive kernels of corn of different sizes and of different grades, according as there are varieties, which facilitates in the use of only one set of plates for the different styles and character of corn planted by the machine carrying said plate.

That the invention may be more fully understood reference is had to the accompanying drawings, in which:—

Figure 1 is a vertical cross section through a seed box and the seeding devices therein and also the seed conductor tube or planter shank; the furrow-opener being only partially shown; Fig. 2 is an enlarged plan view of my improved seed plate and the cap plate to which the same is detachably secured; Fig. 3 is a cross section through the cap plate and ring shown in Fig. 2, as the same would appear on the line X—X of Fig. 5; Fig. 4 is a detail elevation looking in at the inner face of a portion of the seed plate, being that portion of the plate which is provided with the seed opening; Fig. 5 is a bottom plan view of the ring and cap plate shown in Fig. 2, with a portion of the cap plate broken away; Fig. 6 is an enlarged plan view of a portion of the base ring of the hopper and showing the arrangement of the knocker and cut-off and the covering therefor, Fig. 7 is an enlarged sectional detail of the base ring of the hopper and showing how the knocker or the cut-off may be adjusted and Fig. 8 is an enlarged vertical longitudinal section through the base ring of the hopper and showing the relative positions of the cut-off and knocker and the covering therefor; as the same would appear if taken on the line $y$—$y$ of Fig. 6.

Like numerals of reference indicate corresponding parts throughout the figures.

1 denotes a seed hopper, best seen in Fig. 1, which may be of the usual construction, the same adapted to be supported by a base ring 2, said ring having the oppositely disposed slotted ears 3 and the body portion of the said ring is inclined inwardly as at 4, and the lower vertical portion 5 of said ring is provided with overhanging shelf portions 6.
The base ring 2 of the hopper through the vertical portion 5 thereof is adapted to be supported on an annular ring 7, the said ring 7 being provided with an off set 8 on which the base ring is seated and the vertical portion of said base ring is properly held in place on the annular ring by means of a flange 9, as shown in Fig. 1. The annular ring 7 is further provided with a supplemental and depressed off set 10, on which, as will be described, is adapted to rest and rotate the seed plate or ring 47 and cap plate 58 and to one side of said annular ring 7 is provided a seed opening 11, which is best seen at the right of Fig. 1. The annular ring 7 together with the base ring 2 rest upon and are adapted to be fixedly secured to a box 12; said box being preferably of the construction shown in Fig. 1; wherein the same is provided with a central vertical stud 13, a seed opening 14 which is normally disposed beneath the seed opening 11 in the annular ring 7, and the slotted ears 15, to which said ears are pivotally connected the bolts 16, which, when in position are for securing the annular and base rings 7 and 2 respectively to the box 12, extend up through slotted ears 17 of the annular ring 7 and the slotted ears 3 of the base ring 2 and retained in such position by means of washers 18 and winged nuts 19 which engage the upper threaded ends of said bolts 16, somewhat in the manner seen in Fig. 1 of the drawings.

The box 12 when in working position on the planter frame is adapted to be secured upon the upper end of a seed conductor tube or planter shank indicated as 20. The conductor tube as well as the parts previously described are adapted to be arranged in pairs and suitably spaced apart upon what will be known as the runner frame, the frame consisting of parallel supporting bars which I have here indicated as 21 to which portions of the upper end of said planter shank or conductor tube are suitably secured. The conductor tube or planter shank is preferably constructed substantially in the manner seen in Fig. 1, wherein two channel ways 22 and 23 are provided in the length of the said tube or shank, divided by means of a partition which is indicated as 24, the lower end of said partition being raised a suitable distance above a shelf portion 25 at the lower end of said tube or shank. The partition 24 stops short of the upper end of said tube or shank and at its upper end there is pivotally carried at 26 a flip valve 27, the upper end when swung in the two positions shown in Fig. 1 engages the rear wall of said tube or shank and also a short partition 28 extending downwardly from the upper end of said tube or shank. Between the wall 28 and the partition 24 is provided an open way 29 through which seed or kernels of corn will find their way from the seed plates in the seed box to the channel way 22 in the tube or shank. The flip valve 27 is employed for directing the seed or kernels of corn into either one of said channels 22 and 23. When the planter is used for dropping in hills, the flip valve 27 is thrown into the position shown in full lines in Fig. 1, but when the machine is used for drilling said flip valve, it is thrown into the position shown in dotted lines in Fig. 1, which will direct any seed or kernels of corn dropping from the plates into the shank or tube to drop down and through the channel way 23. At both the upper and lower ends of the channel 22 there is provided valves for controlling the ingress to and egress from the channel way 22, while the channel way 23 is open at its lower end and when the flip valve is thrown into position shown in dotted lines, any seed or kernels of corn passing into the shank or tube, will be deposited directly upon the ground. The valve in the channel way 22 serving to check the downward movement of seed or kernels of corn deposited in that portion of said shank, imparting an intermittent movement thereto and retarding its egress from said tube or shank.

The side walls at the upper ends of the shank or tube are slotted as at 30 to adapt the setting in the said shanks of a rock shaft 31 when the different parts of the device are assembled; also, to provide for the easy detachment of the shanks or tubes from the frame and seed box without disturbing the planter shank, the walls of the slots 30 in the said shanks being of sufficient width to allow of such assembling. In this form of construction it is preferable to arrange the rotating shaft in the form of a sleeve upon the rock-shaft, which is a well known construction, although not shown and said rotating and rock shafts may have suitable bearings in the runner frame. On the opposite ends of the rotating shaft will be carried beveled gears, one of which is shown in dotted lines in Fig. 1, and indicated as 33, which operates in an opening in the bottom of the box 12, although such opening has not been shown, and said beveled gear 33 is adapted to be in a continuous mesh and impart motion to a bevel gear 34, revolubly carried on the stud 13 of the box 12; said gear 34 is retained in operative position on said stud by means of a bolt 35, passing up through the stud and a washer 36 and held in place by means of a nut 37, as shown. To prevent accidental displacement of the bolt 35 and to guard against the same becoming loosened through the operation of the device, a spring pin 38 which is secured at one end to a lug on the bottom of the box 12, has its opposite end engaging the head of the bolt as shown in Fig. 1.

On the rock shaft 31 is carried a crank arm 39 to the outer end of which is pivotally connected the upper end of a valve 40. This valve is of considerable length and is adapted through the forward and return movement of the rock shaft to be projected downwardly in the shank or tube 20 and returned; the upper or closed position of said valve 40 being in that position which is shown in Fig. 1 of the drawings. The valve 41 portion proper of the valve 40 is at the lower end thereof and has movement on the shelf portion 25 of said tube or shank 20. The lower portion of the valve 40 being provided with the chambered portion 41 which is so positioned that any seed or kernels of corn which may find their way to the lower end of said shank or tube when the valve is in the position shown in Fig. 1, will drop into the chambered portion of said valve and rest upon the shelf portion 25, which it is believed will be understood. When the rock shaft is operated to project the valve 40 downwardly, the chambered portion thereof will move to the rear and off of the shelf portion 25, to such an extent, that any seed or kernels of corn which may be in the chambered portion thereof, will be discharged from the shelf portion 25 on to the ground. The upper end of the valve 40 has an open slotted portion 42 in which is pivotally mounted and has movement a supplemental valve 43 provided with the shelf portion 44 and the slotted neck portion 45. It is intended that when the valve 40 is closed, being the position seen in Fig. 1, that the valve 43 will be in the position shown in Fig. 1, but that when movement is imparted to the valve 40 for depressing the same, the valve 43 will swing forwardly. This is accomplished through the pivotal connection of the valve 43 with the valve 40 and the slotted neck 45 in which operates a pin 46 which is fixedly secured in the shank or tube as shown.

Assuming that the seed plate has been operated, and one or more kernels of corn have been dropped on to the shelf portion of the valve 43, it will be readily seen that when the rock shaft is operated to depress the valve 40 that the valve 43 will be swung downwardly and outwardly by reason of the provision of the pin 46, and its connection with the slotted neck 45 of the valve 43; this will discharge any seed or kernels of corn from the shelf portion of said valve 43 into the channel 22 of the tube or shank and falling to the lower end of the tube or shank will rest on a solid portion of the lower end of the valve 40, as the chambered portion thereof has been projected outwardly and beyond the partition 24. But as soon as the valve 40 is returned to the position shown in Fig. 1, the seed or kernels of corn at the lower end of the shank or tube will find its way into the chambered portion 41 of said valve and rest upon the shelf portion 25. The description above, it will be understood relates to the first operation of the valve for depositing seed or kernels of corn into the shank or tube, and that with the next operation of the parts which have been just described, it will be seen that the depressing movement of the valve 40 will discharge the seed or kernels of corn on the shelf 25 into the ground simultaneously with the discharge of the seed or kernels of corn from the valve 43 into the lower portion of said tube or shank. In this way, there is always a hill of corn at the lower end of said shank or tube when the valve 40 is depressed, said valves while operating alternately to discharge seed or kernels of corn from the shank or tube and to the lower end thereof, also operates simultaneously by reason of their pivotal connection with each other; the valve 43 operating through the upper slotted portion of the valve 40. The lower end of the shelf of the valve 43, when said valve is raised, engages with the upper end of the partition 24 as shown in Fig. 1. To provide for placing the upper valve and crank arm into the planter shank or conductor tube, the upper forward wall of the said shank or tube is cut away as shown.

The flip valve 27 which has been previously described, is not unlike similar valves which have been used heretofore in planter shanks or conductor tubes and it is adapted to be adjusted from the outside, although no means has been shown in this application for accomplishing this result.

Constructing the conductor tubes or planter shanks as I do with the enlarged slotted opening 30 at the upper ends thereof, to adapt the placing of the rock shaft in the said shank, I do away with the bearing for the said rock-shaft in the walls of the said shanks, which has been a common practice heretofore, and provide as a bearing for the rock shaft the hub of the bevel gears 33 which at one end of the said gears are reduced to the same diameter as the rock shaft while the other end of the hubs of the said gears are enlarged to fit over and be secured to the sleeve-shaft which has been referred to through which the rock-shaft is carried. It is thought that the description will suffice as the construction of this part of the mechanism and that it will not be necessary to show the manner of securing the gears to the sleeve-shaft. The main object in this construction is to obviate a bearing for the rock-shaft in the shanks and to provide for such bearings in the gear, and the sleeve-shaft to which the same are attached is journaled in the frame. I construct the planter in this way for the purpose of preventing any cramping of the rock-shaft in the movement of the planter over the ground. It is well known that at times one side of the planter may be higher than the other and such irregular movement of a planter necessarily will cramp the rock-shaft if it has a bearing in the shanks, which to some extent destroys the efficiency in the operation of parts connected therewith. However, this is entirely obviated by constructing the planter in the manner specified.

The seed-plate or ring which has been referred to is indicated as 47 and is preferably constructed somewhat in the manner shown in Figs. 2, 3, 4 and 5 of the drawings. Said ring being provided with the shelf-portion indicated as 48 and the outer annular flange 49, said flange being normally the full depth of the shelf-portion 48 and extending up above the same as best seen in Figs. 3, 4. Such shelf-portion as well as the flange of the ring may be of a suitable width and height, and at intervals in the shelf-portion said ring is provided with a series of cut-out portions 50 which serve as seed cells, the end walls thereof extending at dissimilar angles as shown. The end walls of said seed-cells 50 are formed by the shelf-portion which has depending portions 51 and 52 and said depending portions when the seed plate or ring is in working position, rest upon and rotate on the off-set 10 of the annular ring 7, while the base of the flanged portion rests and rides upon the off-set 8 of said annular ring 7, see Fig. 1. The shelf portion of said ring overlying the depending portions 51 and 52 which serve as the end-walls of the seed cells 50, are beveled as shown at 53 and 54; the beveled portion 53 being somewhat longer and dropping to a greater depth than that shown at 54, for a purpose to be described, and the inner face of the flange 49 intermediate the end walls of the seed cells is beveled outwardly as shown at 55, while the inner face of the flange 49 of the ring is beveled or provided with the irregular faces as at 56. Beveling the end walls of the seed cells, and the flange in the manner specified, I provide for the use of said seed ring in the planting of corn of different varieties where the kernels vary more or less, obviating the necessity of using more than one seed ring for the different grades of corn. Employing the seed rings as is the custom in connection with suitable cut offs and knockers, the construction of the cells as well as the flanges of the rings enables me by the use of a suitable cutoff to take out any surplus grain or kernels except the one that fills the cell, the cut-off operating in conjunction with the beveling of the end walls of the seed cells and the bevel portion 56 of the ring which allows for the easy removal of the extra kernels of corn which might find their way into the seed cells, and it will be noticed that the end walls of said seed cells are beveled inwardly as at 56ª and 57 so as to prevent the kernels of corn which drop into the seed cells becoming wedged between the end walls thereof and to allow for their easy discharge when engaged by the ejector or knocker.

To the ring 47 is detachably connected a cap plate indicated as 58 which has the dome shaped upper portion 59 as shown and beveled walls 60 which extend up from and coincide with the inner face of the rings 47, the lower portion of said cap plate is provided with a central opening 61 and radiating slots 62. When the cap plate and ring are in working position in the seed boxes, studs or short stems 63 of the gear 34 extend up through the slots 62 of the cap plate as shown in Fig. 1. With this arrangement it will be seen that the gear 34 is operated through the medium of the studs or stems 63 and the slots 62, motion may be imparted to the cap plate and to the seed ring. The manner of connecting the said ring with the cap plate is through the provision of a series of lugs 64 formed integral with said rings and projecting downwardly therefrom and having the beveled inner portions 65 which are adapted to have a wedging engagement with corresponding slots or cut out portions 66 in the cap plate as shown. When the ring and cap plate are secured together it will be seen that the outer lower wall of the cap plate forms a closure for the inner faces of the seed cells 50 in the said ring while the opposite faces of said seed cells, although the cells are partially open are bounded by the wall of the annular ring 7, in which the off set 8 is provided, except when the seed cells coincide with the opening 11 in the annular ring 7, when the seed cells in said ring are closed at the inside and partially open on the outside to allow for the easy discharge of the kernels of corn contained in said seed cells, into the shank or conductor tube beneath.

The seed ring when in working position on the annular ring forming a part of the base of the hopper, has its outer flange portion arranged to rotate beneath the overhanging wall portion of the base-ring, substantially as shown in Fig. 1, the arrangement of the inner annular wall of the base ring above the seed ring together with the bevel face of the cap plate serves to guide kernels of corn on edge into the cells of said seed ring. At a suitable point in the base ring 2, being preferably that portion which is in proximity to and overlies the openings 11 and 14 to the shank, I provide the depressed or cut out portion 67 in which it is adapted to place portions of an ejector or knocker and cut-off which work upon the inside of the seed ring and in the annular groove formed by the walls of the seed ring and the cap plate to which the same is connected, for the purpose of cutting off the excess supply of grain which finds its way into the cells of the seed ring and also for ejecting the same when the cells of the seed ring overlie the openings 11 and 14 in the shank or conductor-tube. A covering 68 is provided for that portion of the base ring which is provided with the cut out portion 67 and the same is suitably secured to the ring by means of a bolt 69 or other suitable securing means and the covering 68 is provided with the projecting portion 70 which partially overlies the cap plate as well as the groove formed by the same and the seed ring and beneath the said extended portion of the covering is operatively carried the knocker. The cut-off which has been referred to is indicated as 71 being provided with a stem or spindle 72 which is journaled in a bearing formed by the base ring 2 and the covering 68 and projecting from said spindle 72 into the cut out portion 67 of the base ring is a plate 73 having an upwardly projected stud or pin 74, which extends up into a dome shaped portion 75 of the base ring 2 in which is arranged a spring 76, coiled about the stud or pin 74, the said spring bearing against the top of the dome referred to and the plate 73 for the purpose of holding the cut off down in the channel or grooves formed by the cap plate and the seed ring, as will be understood. The free end of said cut off coacting with the bevel portions of the seed ring in the manner hereinbefore stated for the purpose of preventing more than one kernel of corn entering each seed cell prior to the seed cells riding beneath the knocker to be described.

The knocker is indicated as 77, and the knocker, barring that portion which operates in the channel or groove formed by the seed ring and the cap plate is in all respects similar to the cut off, that is, the knocker is provided with a spindle 78, journaled in a bearing formed by the base ring 2 and the covering 68 and projecting from the spindle 78 into the cut out portion of the base ring is a plate extension 79 having an upwardly projecting stud or pin 80 which extends up into a dome 81 of the covering 68, and encircling the pin 80 is a spring 80$^a$ which bears against the top of the dome and also the plate 79 for holding the knocker in working position for the purpose of ejecting kernels of corn from the seed cells when the said cells coincide and ride beneath the same.

In Figs. 7 and 8, is shown an adjusting device which I employ in connection with the cut-off and knocker, although it may be preferable to only use such adjusting devices with one or the other of such parts. These devices consists of threaded stems 82, which have connection with a threaded portion of the base ring 2 and are adapted to engage preferably the lower faces of plates 73 and 79 of the cut-off and knocker, just beneath the pins or studs 74 and 80. While the threaded stems 82 are shown without the use of a locknut, yet it is understood that should it be desirable to use such an arrangement that it is contemplated in the within structure.

The object of the threaded stems 82 is to regulate and to adjust the position of that portion of the cut-off and knocker which overlies and works in the groove formed by the flange of the seed ring and the body of the cap plate. As was intimated in the forepart of the specification, with the construction of the plates such as I show, I am enabled to use different varieties and different grades of corn and in changing from one grade of corn to the other, particularly where the kernels of corn will vary in size, it is an advantage to be able to adjust the forward end of the cut-off so that it will operate more or less in the cells of the seed plate. If the kernels of corn are large the free end of the cut-off will not work so deep in the cells, but if the kernels of corn are small, it will be seen that it is an advantage to have the cut-off operate further into the seed cells, so as to properly cut off any surplus kernels of corn which will find their way to the cells prior to the said cells passing beneath the knocker.

Having thus fully described my invention, what I claim and desire to secure by Letters Patent of the United States, is:—

1. In a device of the character described, a seed ring having an annular flange and a shelf portion, the shelf portion having seed cells cut therein at intervals, the end walls of said seed cells being oppositely beveled.

2. In a device of the character described, a seed ring having an annular flange and a shelf portion, the shelf portion having seed cells cut therein at intervals, the end walls of said seed cells being oppositely beveled, and the inner face of the flange in proximity to said cells being also beveled.

3. In a device of the character described, a seed ring having an annular flange and a shelf portion, the shelf portion having seed cells cut therein at intervals, the surface of said shelf portion adjacent to the opposite ends of said seed cells being beveled downwardly and the end walls of said cells being oppositely beveled.

4. In a device of the character described, a seed ring having an annular flange and a shelf portion, the shelf portion having seed cells cut therein at intervals, the opposite end walls of said seed cells being beveled outwardly and the surface of the shelf portion adjacent to the opposite ends of said seed cells being beveled, one side greater than the other, and the said flange in proximity to said cells being also beveled.

5. In a device of the character described, a seed ring having an annular flange and a shelf portion, the shelf portion having seed cells cut therein at intervals, the inner face of said flange coinciding with said cells being beveled outwardly, the opposite end walls of said seed cells being also beveled, and the face of the flange in proximity to one of the end walls of said cells being beveled.

6. In a device of the character described, a seed ring having an annular flange and a shelf portion, the shelf portion having seed cells cut therein at intervals, a dome shaped cap plate and means for detachably connecting the same to the seed ring, the end walls of the said seed cells of the seed ring having dissimilar beveled portions, and the inner face of the flange in proximity to the seed cells of the ring being also beveled.

7. In a device of the character described, a seed ring having an annular flange and a shelf portion, the shelf portion having seed cells cut therein at intervals, a dome shaped cap plate, wedging lugs on the seed ring having connection with cut out portions in the cap plate for detachably connecting the cap plate and seed ring, the end walls of the seed cells of said ring having dissimilar beveled portions, and the lower inner face of the flange of the ring coinciding with the cells, being beveled outwardly, and the inner face of said flange having additional beveled portions in proximity to said seed cells.

8. In a corn planter, the combination of a seed plate, a cut-off coöperating therewith, and means for adjusting the position of the free end of said cut-off.

9. In a corn planter, the combination of a seed plate comprising a ring and a cap plate detachably connected therewith, of a cut off coöperating with said seed plate, and means for adjusting the free end of said cut-off.

10. In a corn planter, the combination of a seed plate provided with a series of seed cells, a cut off coöperating with said seed cells, and means for adjusting the free end of said cut off with respect to the depth of said cells.

11. In a corn planter, the combination with the base ring of a hopper, a seed plate rotating within said ring, a cut-off pivotally mounted in the base ring and having a portion coöperating with the cells of the seed plate, and means for adjusting that portion of said cut-off which coöperates with the seed cells.

12. In a corn planter, the combination with the base ring of a hopper, a seed plate rotating within said ring, a cut-off pivotally mounted in said base ring and having a portion coöperating with the cells of the seed plate, means for yieldingly holding the cut-off in operative engagement with the cells of the seed plate, and means for adjusting the said cut off.

13. In a corn planter, the combination with the base ring of a hopper, a seed plate rotating within said ring, a cut off pivotally mounted in said base ring and having a portion in operative engagement with the cells of the seed plate, a covering plate for securing the cut-off in working position on the base ring, and means for adjusting said cut-off.

14. In a corn planter, the combination with the base ring of a hopper, a seed plate rotating within said ring, a cut-off pivotally mounted in said base ring, a knocker also pivotally mounted in said base ring and said knocker and cut off having portions coöperating with the seed plate, a cap plate for securing the cut-off and knocker in working position in the base ring, and means for adjusting the position of the cut-off.

15. In a corn planter, the combination with the base ring of a hopper, having a channel in the same, a seed plate rotating within said ring, a cut-off pivotally mounted in the base ring and having a portion working in the channel thereof and a portion without said ring coöperating with the cells of the seed plate, and means for adjusting that portion of the cut-off in the base ring and thereby correspondingly adjust that portion without the same.

16. In a corn planter, the combination with the base ring of a hopper, a seed plate rotating within said ring, a cut-off pivotally mounted in the base ring and having an arm overlying a portion of the ring and also an arm without the ring coöperating with the cells of the seed plate, a covering plate for securing the cut-off in working position on the base ring, a spring operating between the arm of the cut-off overlying a portion of the ring and said covering plate, and a bolt operating through the base ring for adjusting the said cut-off.

17. In a corn planter, the combination of a conductor tube having two separate seed channels one of which has a valve seat at its lower end, a valve pivotally mounted at the upper end of one of said channels and having a receiving portion operating on the seat at the lower end thereof, a flip-valve controlling an inlet between the two channels, and a valve pivotally connected with and operating through the upper end of said first mentioned valve and adapted to receive seed discharged into said conductor tube which passes from one channel to the other.

18. In a corn planter, the combination of a conductor tube having two elongated seed channels divided by a partition extending part way through said tube, a shaft operatively carried through the upper end of said tube, an elongated valve extending down through one of said seed channels having a receiving portion at its lower end, connections between the upper end of said valve and said shaft, and a valve pivotally connected and operating through the upper end of said first mentioned valve adapted to receive seed discharged into the conductor tube and to release the same into the lower portion of said tube when said first mentioned valve is operated.

19. In a corn planter, the combination of a conductor tube, a shaft passing through the upper end of said tube, a valve pivotally connected with said shaft and extending the length of said tube and having a receiving portion at its lower end, a valve pivotally connected at the upper end of said first mentioned valve and having a portion operating through the same, the arrangement of said valve being such that as said first mentioned valve is operated to discharge seed from the receiving portion at the lower end thereof, that the last mentioned valve will discharge any seed resting thereon into the lower end of said tube to be received by the receiving portion of the first mentioned valve when the same is returned.

20. In a corn planter, the combination with a conductor tube, of a valve having a slotted upper portion and a lower portion controlling the discharge of seed from said tube, a valve pivotally connected to the upper end of said first mentioned valve and having an extension operating through the slotted portion thereof, said last mentioned valve adapted to control the passage of seed from the upper end of the conductor tube to the lower end thereof.

21. In a corn planter, the combination with a conductor tube, of a valve having a slotted upper portion and a lower portion controlling the discharge of seed from the lower end of said tube, a valve for controlling the passage of seed from the upper end to the lower end of said tube, said valve pivotally connected to said first mentioned valve and provided with a slotted extension operating through the slotted portion thereof, and a pin secured to the conductor tube passing through the slotted extension of said last mentioned valve for guiding said valve in its movement.

22. In a corn planter, the combination of a conductor tube, a shaft passing through the upper end of said tube, a crank arm connected with said shaft within said tube, a valve pivotally connected with said crank arm extending the length of said tube and provided with means for regulating the discharge of seed from the lower end of said tube, a valve for controlling the passage of seed from the upper to the lower end of said tube, said valve provided with a slotted extension operating through said first mentioned valve, and a pin secured in said tube and extending through said slotted extension, for guiding said valve in its movement.

23. In a corn planter, the combination of a conductor tube having upper slotted side walls, a shaft passing through the slots in the said walls without bearing against the same, and a valve pivotally connected with said shaft for controlling the discharge of seed from the lower end of said tube, the second valve pivoted to the upper end of said first mentioned valve for controlling the passage of seed from the upper to the lower end of said tube.

24. In a corn planter, the combination with the base ring of a hopper, of a seed ring, a cut-off, and means for adjusting the position of the free end of said cut-off.

25. In a corn planter, the combination of a seed ring, a cut-off consisting of a spindle, from one end projects a finger, a plate projecting from the body of said spindle and provided with a stud at its outer end, means for adjusting said plate and thereby the finger of the spindle, and a spring adapted to encircle the stud of said plate.

26. In a corn planter, the combination with the base ring of a hopper, of a seed ring a cut-off supported by said base ring, means for adjusting said cut-off, and a covering plate.

27. In a device of the character described, a seed ring provided with a plurality of elongated seed cells open on the inner side of said ring, a detachable center plate for said ring, provided with a plurality of notches in its periphery, and wedge shaped lugs attached to the seed ring and adapted to have connection with the notches of the center plate.

28. In a device of the character described, a seed ring having an annular flange and a shelf portion, the shelf portion provided with a plurality of seed cells and a plurality of lugs projecting upwardly and inwardly from the inner edge of said shelf portion, a center plate for said ring, provided with a series of notches capable of being engaged by the wedge shaped lugs of the ring for connecting the ring and the center plate, the center plate when connected to said ring forming a wall for the open portions of said cells where they are coincident.

29. In a device of the character described, a seed ring having an annular flange and a shelf portion, the shelf portion having seed cells cut therein at intervals, the end walls of said cells being oppositely beveled, and a center covering plate detachably connected with said ring.

30. A seed ring having a shelf portion with said cells cut therein at intervals, an outer flange projecting upwardly from said shelf portion, the said shelf portion upon opposite ends of the cells provided with depending portions forming end walls for said cells, and the inner face of said flange between the end wall of said cells being beveled outwardly.

31. A seed ring consisting of a shelf portion and an outer flange, said shelf portion having cut therein a plurality of seed cells, said cells having open inner faces and cut under said flange upon the outside of said ring.

32. A seed ring consisting of a shelf portion and an outer flange, said shelf portion provided with a plurality of seed cells having oppositely beveled end walls, said shelf having open inner faces and cut under said flange upon the outside of said ring.

33. In a corn planter, the combination of a base ring having an off-set forming a shelf portion, and provided with a seed opening, a seed ring revolubly mounted on said base ring, said seed ring having a shelf portion provided with a plurality of seed cells, said cells cut under the outer portion of said ring to present an open face, normally closed by the off-set of the base ring and exposed when coincident with the seed opening thereof.

34. A seed plate having cells, each of said cells capable of receiving and holding only a single kernel of field corn length-wise, and also capable of receiving and holding kernels of corn, both large and small, and the outer portions of said cells underlying and protected by a portion of the plate so that kernels of corn will not be displaced by a cut-off when moving thereunder.

35. A seed plate having elongated cells which are cut under the outer portion of said plate, each cell capable of receiving and holding only a single kernel of field corn length-wise, and also capable of receiving and holding both large and small kernels of corn.

In testimony whereof I affix my signature, in presence of two witnesses.

LORENZO D. BENNER.

Witnesses:
CHAS. W. LA PORTE,
JEANNETTE M. ANDERSON.